United States Patent
Nagamine et al.

(10) Patent No.: US 10,629,877 B2
(45) Date of Patent: Apr. 21, 2020

(54) BATTERY PACK

(71) Applicant: TOYOTA JIDOSHA KABUSHIKI KAISHA, Toyota-shi, Aichi-ken (JP)

(72) Inventors: Koichi Nagamine, Toyota (JP); Yoshiki Nakatsuru, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/274,696

(22) Filed: Feb. 13, 2019

(65) Prior Publication Data

US 2019/0259997 A1    Aug. 22, 2019

(30) Foreign Application Priority Data

Feb. 16, 2018    (JP) .................................. 2018-026123

(51) Int. Cl.
  *H01M 2/10*    (2006.01)
  *B60R 16/04*   (2006.01)

(52) U.S. Cl.
  CPC ........... *H01M 2/1083* (2013.01); *B60R 16/04* (2013.01); *H01M 2/1077* (2013.01); *H01M 2220/20* (2013.01)

(58) Field of Classification Search
  CPC .. B60L 11/00; B60K 1/00; B60K 1/04; B60K 2001/0405; B60K 2001/0416; B60K 2001/0438; B60K 16/04; H01M 23/1083; H01M 2220/20
  See application file for complete search history.

(56) References Cited

U.S. PATENT DOCUMENTS

| | | | |
|---|---|---|---|
| 5,948,298 A * | 9/1999 | Ijaz ........................ | B60L 50/64 219/209 |
| 9,216,638 B2 * | 12/2015 | Katayama ................ | B60K 1/04 |
| 9,937,781 B1 * | 4/2018 | Bryer ....................... | B60K 1/04 |
| 2006/0204840 A1 * | 9/2006 | Jeon ..................... | H01M 2/1077 429/152 |
| 2012/0244397 A1 * | 9/2012 | Tenhouten ........... | H01M 2/1005 429/61 |
| 2017/0285090 A1 * | 10/2017 | Dietze .................. | G01R 31/396 |
| 2019/0296310 A1 * | 9/2019 | Newman ............... | H01M 2/206 |

FOREIGN PATENT DOCUMENTS

| | | |
|---|---|---|
| JP | 2007-203912 A | 8/2007 |
| JP | 2013-032066 A | 2/2013 |
| JP | 2015-504235 A | 2/2015 |
| WO | 2013/155106 A1 | 10/2013 |

* cited by examiner

*Primary Examiner* — John D Walters
*Assistant Examiner* — James J Triggs
(74) *Attorney, Agent, or Firm* — Sughrue Mion, PLLC

(57) ABSTRACT

A battery pack includes a lower case having a plurality of cell fastening portions fastened to a plurality of cells, respectively, and a bracket to support the lower case to a floor panel of a vehicle. The bracket has a plurality of case fastening portions fastened to the lower case, and a body fastening portion to be fastened to the floor panel. The body fastening portion is disposed on the outer side of the vehicle relative to an outermost cell fastening portion disposed on the outermost side of the vehicle of the plurality of cell fastening portions. The case fastening portions are disposed on the inner side of the vehicle relative to the outermost cell fastening portion.

3 Claims, 4 Drawing Sheets

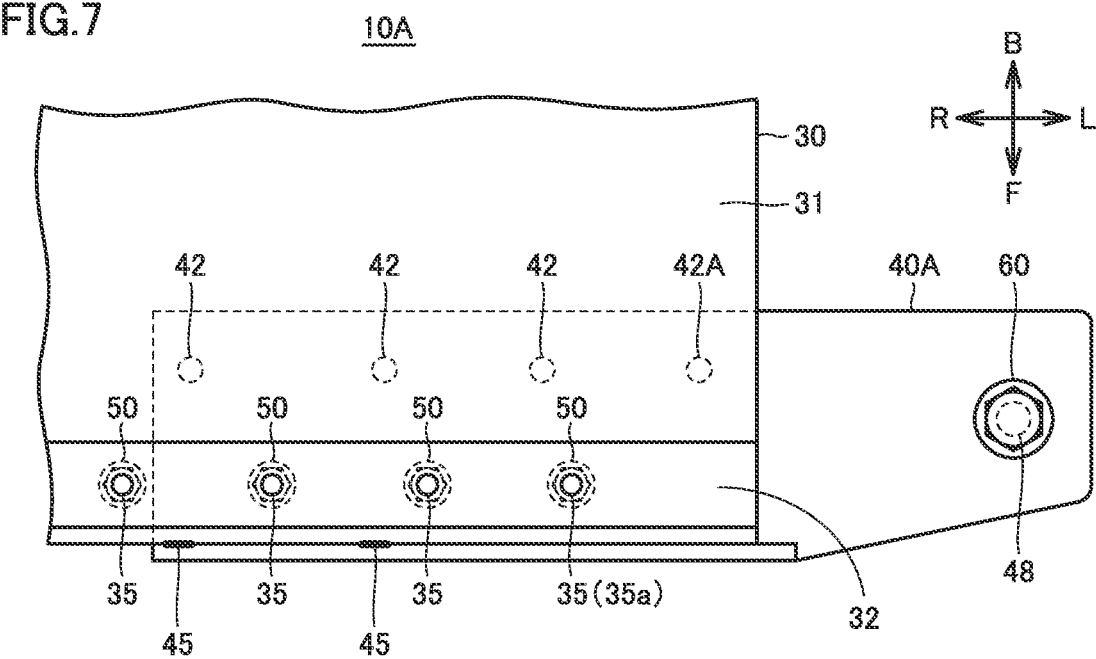

BATTERY PACK

This nonprovisional application is based on Japanese Patent Application No. 2018-026123 filed on Feb. 16, 2018 with the Japan Patent Office, the entire contents of which are hereby incorporated by reference.

BACKGROUND

Field

The present disclosure relates to a battery pack mountable on a vehicle.

Description of the Background Art

Japanese Patent Laying-Open No. 2007-203912 discloses a battery pack mounted on a vehicle. This battery pack includes a battery case accommodating internal cells, and a bracket for fastening the battery case to a platform (body member) of the vehicle. A base end portion of this bracket is welded to an end portion of a lower surface of the battery case on the outer side of the vehicle. A tip end portion of the bracket projects to the outer side of the vehicle relative to the end portion of the lower surface of the battery case, and is fastened by a bolt and a nut to a cross member provided on the platform of the vehicle. As a result, the end portion of the lower surface of the battery case is fastened to the platform of the vehicle via the bracket.

SUMMARY

Some battery packs have a structure including a battery module formed of a plurality of stacked cells inside a battery case, each of the plurality of cells being fastened to the battery case.

In a battery pack having such a structure, if an end portion of a lower surface of a battery case on the outer side of a vehicle is fastened to a body member of the vehicle as is described in Japanese Patent Laying-Open No. 2007-203912, in case of a vehicle crash, a load from the body member of the vehicle may be transmitted in a concentrated manner to the end portion of the lower surface of the battery case on the outer side of the vehicle via a bracket. As a result, stress occurs in a concentrated manner at a fastening portion disposed on the outermost side of the vehicle (hereinafter also referred to as an "outermost cell fastening portion") of a plurality of fastening portions fastening the battery case and a plurality of cells, respectively. This may disadvantageously result in damage to the outermost cell fastening portion.

The present disclosure has been made to solve the aforementioned problem, and aims to resist damage to an outermost cell fastening portion (a portion where a battery case and a cell disposed on the outermost side of a vehicle are fastened to each other) in a battery pack mountable on the vehicle.

(1) A battery pack according to the present disclosure is mountable on a vehicle. This battery pack includes: a battery module formed of a plurality of stacked cells; a battery case having a plurality of cell fastening portions, each of the plurality of cell fastening portions fastened to a corresponding one of the plurality of cells; and a support member to support the battery case to a body member of the vehicle. The support member has a body fastening portion to be fastened to the body member, and one or more case fastening portions fastened to the battery case. The body fastening portion is disposed on an outer side of the vehicle relative to an outermost cell fastening portion disposed on an outermost side of the vehicle of the plurality of cell fastening portions. The one or more case fastening portions are disposed on an inner side of the vehicle relative to the outermost cell fastening portion.

In the battery pack described above, the battery case is fastened to the plurality of cells at the plurality of cell fastening portions, respectively, and is supported to the body member of the vehicle via the support member. Here, the portion of the support member that is fastened to the battery case (case fastening portion) is disposed on the inner side of the vehicle relative to the outermost cell fastening portion. Thus, as compared to an example where the case fastening portion is disposed on the outer side of the vehicle relative to the outermost cell fastening portion, a load transmitted from the body member to the battery case via the support member in case of a vehicle crash is more likely to be distributed to the cell fastening portions other than the outermost cell fastening portion (that is, the cell fastening portions disposed on the inner side of the vehicle relative to the outermost cell fastening portion), so that the concentration of stress at the outermost cell fastening portion is suppressed. As a result, damage to the outermost cell fastening portion can be resisted.

(2) In one embodiment, the support member extends in a longitudinal direction of the battery module.

According to the embodiment described above, the support member extends in the longitudinal direction of the battery module. Thus, as compared to an example where the support member extends in the short direction of the battery module, the width of the entire battery pack (the length in the short direction of the battery module) can be reduced. Accordingly, the battery pack can be more readily mounted on the vehicle in a compact manner.

(3) In one embodiment, the support member has a plurality of the case fastening portions. At least one of the plurality of the case fastening portions is disposed on the inner side of the vehicle relative to the outermost cell fastening portion.

According to the embodiment described above, the support member is fastened to the battery case at the plurality of case fastening portions. Thus, the support member and the battery case are more firmly fastened to each other, so that the removal of the support member from the battery case can be resisted even when a high load occurs in case of a vehicle crash.

In addition, at least one of the plurality of case fastening portions is disposed on the inner side of the vehicle relative to the outermost cell fastening portion. Thus, a load transmitted from the body member to the battery case via the support member in case of a vehicle crash is partly transmitted to the battery case from the case fastening portions disposed on the inner side of the vehicle relative to the outermost cell fastening portion. As a result, as compared to an example where the plurality of case fastening portions are all disposed on the outer side of the vehicle relative to the outermost cell fastening portion, the concentration of stress at the outermost cell fastening portion is suppressed in case of a vehicle crash. As a result, the removal of the support member from the battery case can be resisted, and damage to the outermost cell fastening portion can be resisted.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a diagram (No. 2) of the portion surrounding the bracket in the battery pack, as seen from above the vehicle.

DESCRIPTION OF THE PREFERRED EMBODIMENTS

Figure 1:
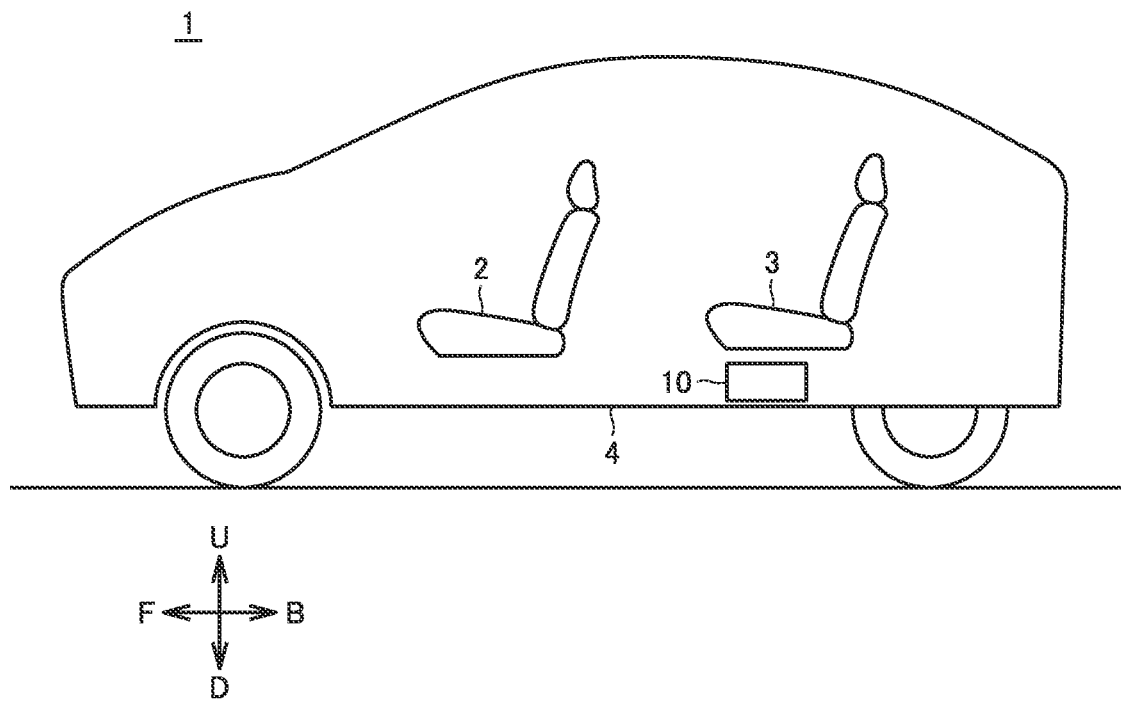
FIG. 1 is an overall view of a vehicle on which a battery pack is mounted.

In the following, an embodiment of the present disclosure will be described in detail with reference to the drawings. It should be noted that the same or corresponding parts are designated by the same symbols in the drawings and will not be described repeatedly.

FIG. 1 is an overall view of a vehicle 1 on which a battery pack 10 according to the embodiment of the present disclosure is mounted. In the following, the direction of an arrow F shown in FIG. 1 may be referred to as "the front of the vehicle" or simply as "the front," the direction of an arrow B may be referred to as "the rear of the vehicle" or simply as "the rear," the direction of an arrow U may be referred to as "above the vehicle" or simply as "above," and the direction of an arrow D may be referred to as "below the vehicle" or simply as "below."

This vehicle 1 includes a front seat 2, a rear seat 3, a floor panel 4, and battery pack 10.

Battery pack 10 is a power storage device storing electric power for generating driving force of traveling of vehicle 1. In the present embodiment, battery pack 10 is mounted in a space below rear seat 3 and above floor panel 4 within a vehicle interior. The location where battery pack 10 is mounted is not limited to the space below rear seat 3 and above floor panel 4. For example, the location may be at the rear of rear seat 3, below front seat 2, or below floor panel 4.

Figure 2:
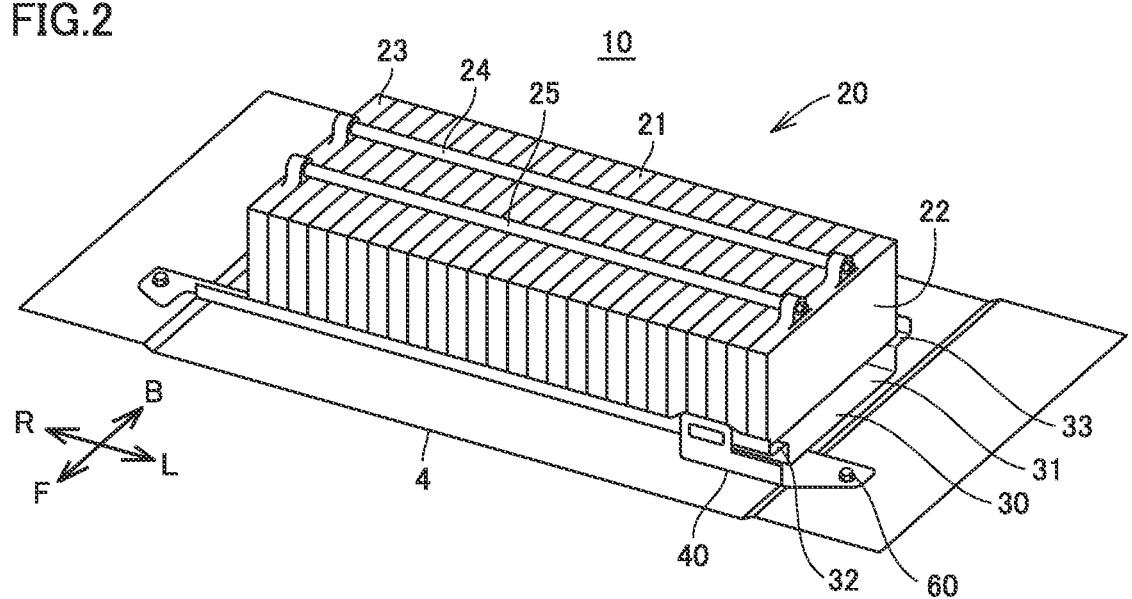
FIG. 2 schematically shows an internal structure of the battery pack.

FIG. 2 schematically shows an internal structure of battery pack 10. In the following, the direction of an arrow R shown in FIG. 2 may be referred to as "the right side of the vehicle," and the direction of an arrow L may be referred to as "the left side of the vehicle."

Battery pack 10 includes a battery module 20, a lower case (battery case) 30, and a bracket (support member) 40.

Battery module 20 includes a plurality of battery cells 21 stacked in the right and left direction of the vehicle, a pair of end plates 22, 23, and restraint bands 24, 25. A secondary battery such as a nickel-metal hydride battery or a lithium ion battery is used as each battery cell 21. Alternatively, battery cell 21 may be a battery using a liquid material for an electrolyte, or may be a battery using a solid material for an electrolyte (so-called all-solid-state battery). Adjacent battery cells 21 are connected in series with each other by a bus bar (not shown).

The pair of end plates 22, 23 is arranged at one end and the other end in the stacking direction of battery module 20 (the right and left direction of the vehicle) so as to face each other. The pair of end plates 22, 23 is restrained by the pair of restraint bands 24, 25 while sandwiching and compressing the plurality of battery cells 21 between them.

A lower surface of battery module 20 is covered by lower case (battery case) 30.

Battery module 20 is accommodated in a space covered by lower case 30 and an upper case which is not shown in the figure.

Lower case 30 has a lower surface portion 31, and step portions 32, 33 located higher in the vehicle than lower surface portion 31. Step portion 32 is formed at an end portion of lower case 30 at the front of the vehicle, so as to extend in the right and left direction of the vehicle. Step portion 33 is formed at an end portion of lower case 30 at the rear of the vehicle, so as to extend in the right and left direction of the vehicle. The plurality of battery cells 21 are fixed to lower case 30 while being in contact with step portions 32, 33 of lower case 30 (see FIGS. 3 to 5 described later).

Bracket 40 is a support member to support lower case 30 to floor panel 4 serving as a body member of vehicle 1. Bracket 40 extends in the stacking direction of battery cells 21 (that is, the right and left direction of the vehicle) corresponding to the longitudinal direction of battery module 20. A base portion of bracket 40 is welded to an end portion of lower case 30 at the front of the vehicle as well as at the left side of the vehicle. A tip end portion of bracket 40 is fastened to floor panel 4 by a fastening member 60.

Figure 3:
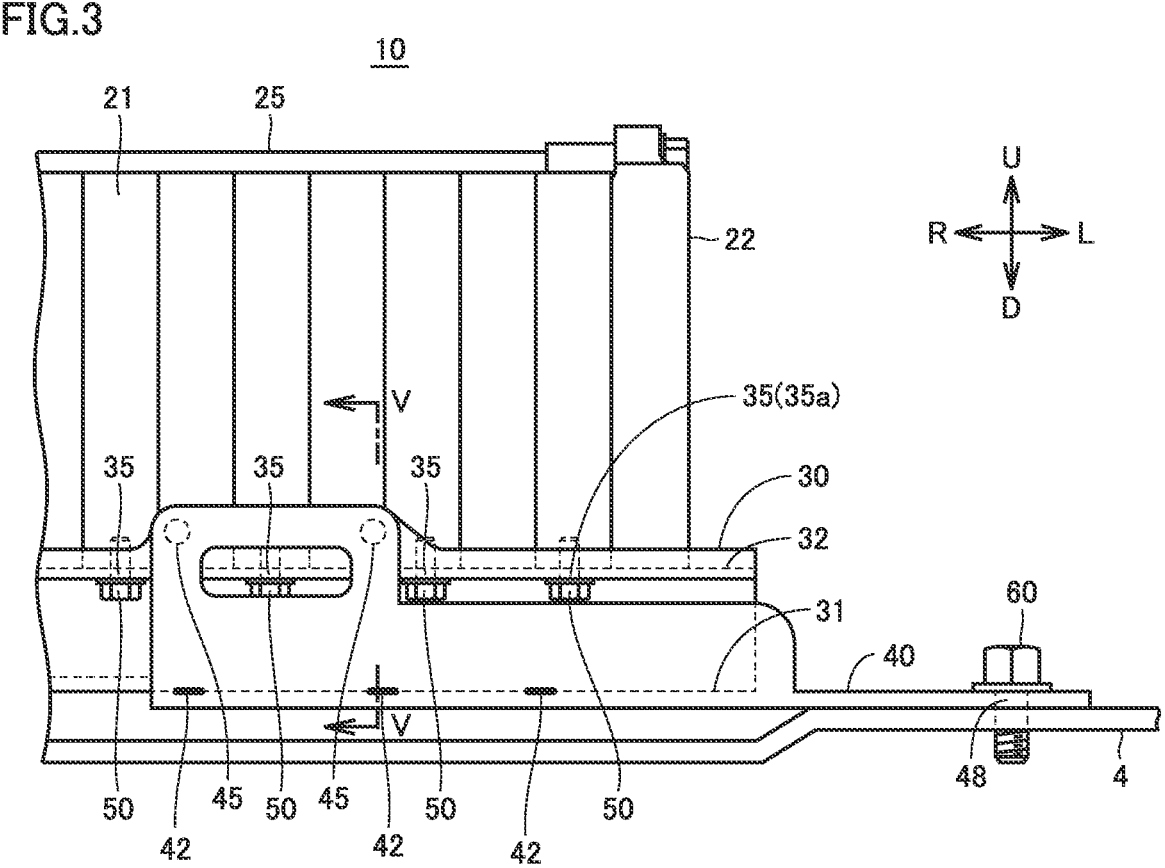
FIG. 3 is a diagram (No. 1) of a portion surrounding a bracket in the battery pack, as seen from the front of the vehicle.
Figure 4:
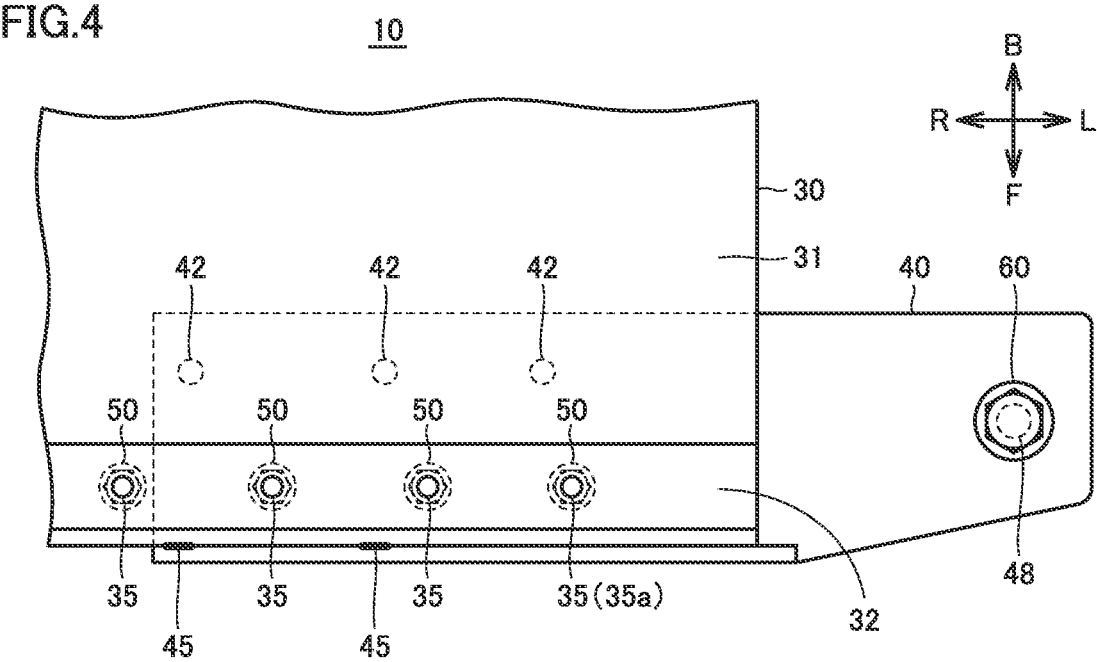
FIG. 4 is a diagram (No. 1) of the portion surrounding the bracket in the battery pack, as seen from above the vehicle.
Figure 5:
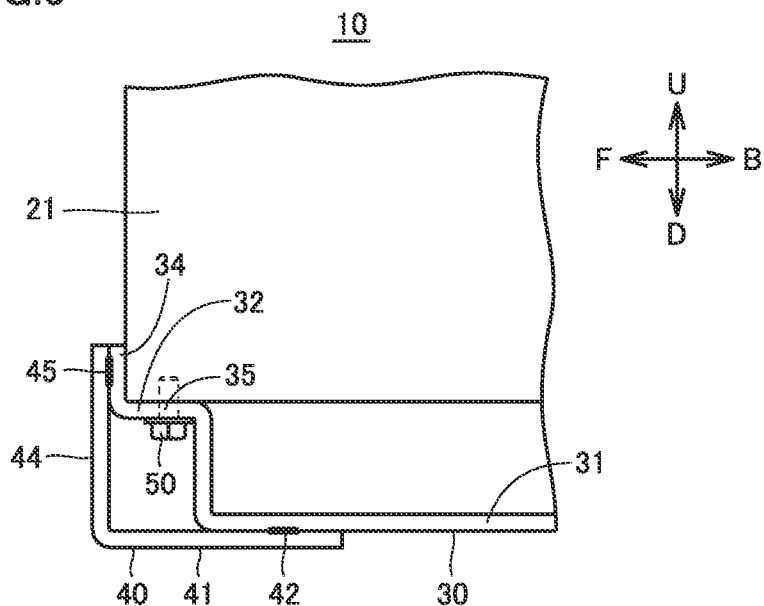
FIG. 5 is a cross-sectional view taken along the line V-V in FIG. 3.

FIG. 3 is a diagram of a portion surrounding bracket 40 in battery pack 10, as seen from the front of the vehicle. FIG. 4 is a diagram of the portion surrounding bracket 40 in battery pack 10, as seen from above the vehicle. FIG. 5 is a cross-sectional view taken along the line V-V in FIG. 3.

Referring to FIGS. 3 to 5, the structure surrounding bracket 40 in battery pack 10 is described in detail.

Lower case 30 has a plurality of cell fastening portions 35 where the plurality of battery cells 21 are fastened, respectively. Each battery cell 21 is fastened to lower case 30 by a fastening member (bolt) 50.

In the present embodiment, as shown in FIG. 3, the plurality of cell fastening portions 35 are formed at step portion 32 of lower case 30 at the front of the vehicle. Then, the plurality of battery cells 21 at odd-numbered (first, third, fifth . . . ) positions starting from the left side of the vehicle are fastened to the plurality of cell fastening portions 35 formed at step portion 32 at the front of the vehicle, respectively. Although not shown, the plurality of battery cells 21 at even-numbered (second, fourth, sixth . . . ) positions starting from the left side of the vehicle are fastened to step portion 33 (see FIG. 1) of lower case 30 at the rear of the vehicle.

In the following, a cell fastening portion 35 disposed on the leftmost side of the vehicle (outermost side of the vehicle) of the plurality of cell fastening portions 35 in lower case 30 is also referred to as an "outermost cell fastening portion 35a" for the purpose of illustration.

As shown in FIG. 5, bracket 40 includes a lower surface portion 41 in contact with lower surface portion 31 of lower case 30, and a side surface portion 44 in contact with a side surface portion 34 of lower case 30.

Side surface portion 44 of bracket 40 is spot welded to side surface portion 34 of lower case 30 at two case fastening portions 45 spaced apart a predetermined distance in the right and left direction of the vehicle.

Lower surface portion 41 of bracket 40 is spot welded to lower surface portion 31 of lower case 30 at three case fastening portions 42 spaced apart a predetermined distance in the right and left direction of the vehicle.

Lower surface portion 41 of bracket 40 is also fastened to floor panel 4 by fastening member (bolt) 60 at a body fastening portion 48 provided at a tip end portion on the left side of the vehicle.

In this manner, bracket 40 has the plurality of case fastening portions 42, 45 fastened to lower case 30, and body fastening portion 48 fastened to floor panel 4 (body member).

Body fastening portion 48 of bracket 40, which serves as a portion fastened to floor panel 4, is disposed on the outer side of the vehicle (the left side of the vehicle in FIGS. 3 to 5) relative to outermost cell fastening portion 35a described above.

The plurality of case fastening portions 42, 45 of bracket 40, which serve as portions fastened to lower case 30, are all disposed on the inner side of the vehicle (the right side of the vehicle in FIGS. 3 to 5) relative to outermost cell fastening portion 35a.

In battery pack 10 having a configuration as described above, damage to outermost cell fastening portion 35a of lower case 30 can be resisted in case of a crash of vehicle 1. This is described below.

In battery pack 10 according to the present embodiment, lower case 30 is fastened to the plurality of battery cells 21 at the plurality of cell fastening portions 35, respectively, and is supported to floor panel 4 (body member of vehicle 1) via bracket 40.

Body fastening portion 48 of bracket 40, which serves as a portion fastened to floor panel 4, is disposed on the outer side of the vehicle relative to outermost cell fastening portion 35a. In case of a crash of vehicle 1, a load from floor panel 4 is transmitted from body fastening portion 48 to bracket 40.

Bracket 40 according to the present embodiment is formed of a member separate from a member for lower case 30. Thus, as compared to an example where bracket 40 is formed integrally with lower case 30, a load transmitted from floor panel 4 to bracket 40 in case of a vehicle crash is more likely to be absorbed by bracket 40 alone due to the deformation of bracket 40 and the like. Accordingly, the direct transmission of the crash load to lower case 30 can be made less likely.

In addition, case fastening portions 42, 45 of bracket 40 are all disposed on the inner side of the vehicle relative to outermost cell fastening portion 35a. Thus, as compared to an example where the case fastening portions of bracket 40 are disposed on the outer side of the vehicle relative to outermost cell fastening portion 35a, a load transmitted from floor panel 4 to lower case 30 via bracket 40 in case of a vehicle crash is more likely to be distributed to cell fastening portions 35 other than outermost cell fastening portion 35a (that is, cell fastening portions 35 disposed on the inner side of the vehicle relative to outermost cell fastening portion 35a), so that the concentration of stress at outermost cell fastening portion 35a is suppressed. As a result, damage to outermost cell fastening portion 35a can be resisted.

Furthermore, bracket 40 according to the present embodiment extends in the longitudinal direction of battery module 20 (the stacking direction of the battery cells). Thus, as compared to an example where bracket 40 extends in the short direction of battery module 20, the width of the entire battery pack 10 (the length in the short direction of the battery module) can be reduced. Accordingly, battery pack 10 can be more readily mounted on vehicle 1 in a compact manner.

Furthermore, bracket 40 according to the present embodiment is fastened to lower case 30 at the plurality of case fastening portions 42, 45. Thus, bracket 40 and lower case 30 are firmly fastened to each other, so that the removal of bracket 40 from lower case 30 can be resisted even when a high load occurs in case of a vehicle crash.

Modification

The embodiment described above has discussed an example where the portions of bracket 40 that are fastened to lower case 30 (case fastening portions 42, 45) are all disposed on the inner side of the vehicle relative to outermost cell fastening portion 35a.

However, one of the portions of bracket 40 that are fastened to lower case 30 may be disposed on the outer side of the vehicle relative to outermost cell fastening portion 35a.

Figure 6:
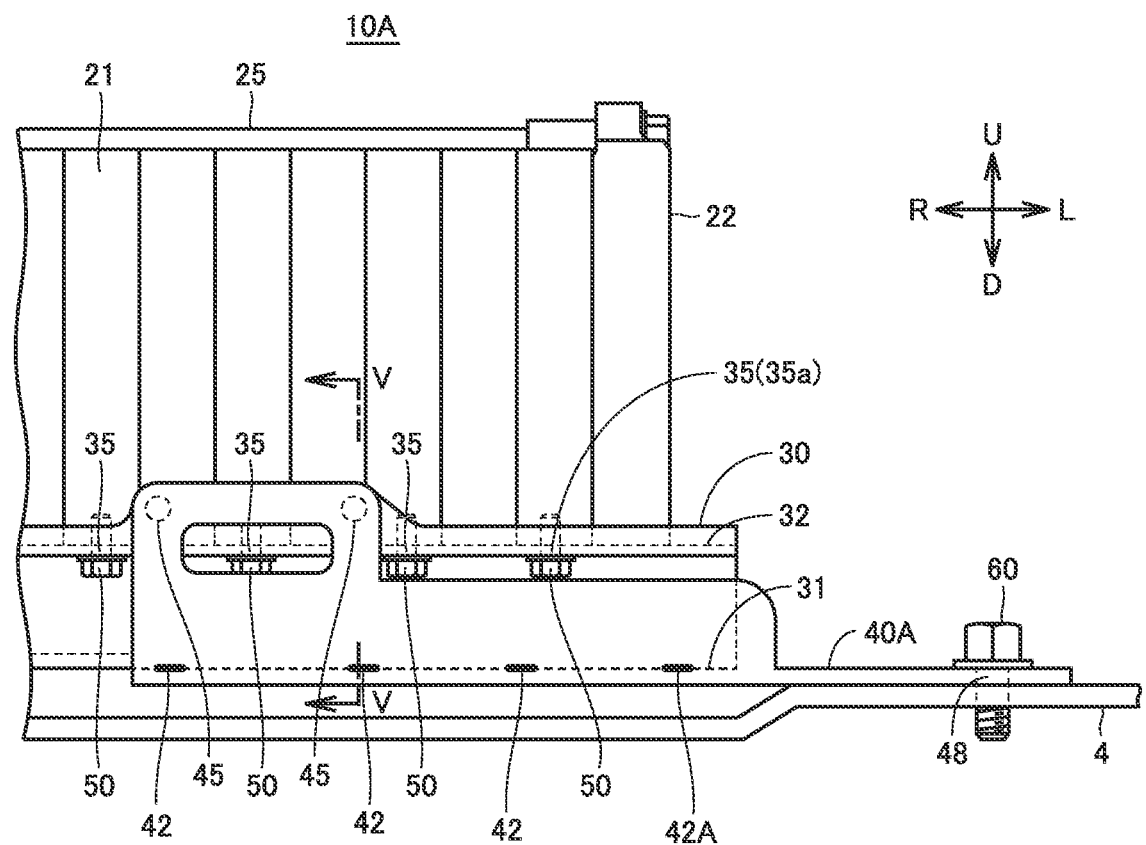
FIG. 6 is a diagram (No. 2) of a portion surrounding a bracket in a battery pack, as seen from the front of the vehicle.

FIG. 6 is a diagram of a portion surrounding a bracket 40A in a battery pack 10A according to the present modification, as seen from the front of the vehicle. FIG. 7 is a diagram of the portion surrounding bracket 40A in battery pack 10A according to the present modification, as seen from above the vehicle.

As compared to battery pack 10 described above, battery pack 10A according to the present modification further includes a case fastening portion 42A, in addition to case fastening portions 42, 45 described above, as a location of bracket 40 that is welded to lower case 30. The structure, function and process are otherwise the same as those of the embodiment described above, and thus will not be described repeatedly in detail here.

In such battery pack 10A, bracket 40 and lower case 30 are more firmly fastened to each other, so that the removal of bracket 40 from lower case 30 can be further resisted.

Furthermore, as shown in FIGS. 6 and 7, case fastening portion 42A is disposed on the outer side of the vehicle relative to outermost cell fastening portion 35a. However, the remaining plurality of case fastening portions 42, 45 are disposed on the inner side of the vehicle relative to outermost cell fastening portion 35a. Thus, a load transmitted from floor panel 4 to lower case 30 via bracket 40 in case of a vehicle crash is mostly transmitted to lower case 30 from case fastening portions 42, 45 disposed on the inner side of the vehicle relative to outermost cell fastening portion 35a. As a result, the concentration of stress at outermost cell fastening portion 35a is suppressed in case of a vehicle crash, as in the embodiment described above. As a result, the removal of bracket 40 from lower case 30 can be further resisted, and damage to outermost cell fastening portion 35a can be resisted.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery pack mountable on a vehicle, comprising:
    a battery module formed of a plurality of stacked cells;
    a battery case having a plurality of cell fastening portions, each of the plurality of cell fastening portions fastened to a corresponding one of the plurality of cells; and
    a support member to support the battery case to a body member of the vehicle,
    the support member having
        a body fastening portion to be fastened to the body member, and one or more case fastening portions fastened to the battery case, the body fastening portion being disposed on an outer side of the vehicle relative to an outermost cell fastening portion disposed on an outermost side of the vehicle of the plurality of cell fastening portions, and the one or more case fastening portions being disposed on an inner side of the vehicle relative to the outermost cell fastening portion.

2. The battery pack according to claim 1, wherein the support member extends in a longitudinal direction of the battery module.

3. The battery pack according to claim 1, wherein the support member has a plurality of the case fastening portions, and at least one of the plurality of the case fastening portions is disposed on the inner side of the vehicle relative to the outermost cell fastening portion.

* * * * *